United States Patent
Liu (10) Patent No.: US 9,732,993 B2
(45) Date of Patent: Aug. 15, 2017

(54) REFRIGERANT CIRCUIT AND METHOD OF CONTROLLING SUCH A CIRCUIT

(75) Inventor: Jin-Ming Liu, Conflans Sainte Honorine (FR)

(73) Assignee: VALEO SYSTEMS THERMIQUES, Le Mesnil Saint Denis (FR)

(*) Notice: Subject to any disclaimer, the term of this patent is extended or adjusted under 35 U.S.C. 154(b) by 559 days.

(21) Appl. No.: 14/126,231

(22) PCT Filed: Apr. 25, 2012

(86) PCT No.: PCT/EP2012/001776
§ 371 (c)(1),
(2), (4) Date: Feb. 18, 2014

(87) PCT Pub. No.: WO2012/171601
PCT Pub. Date: Dec. 20, 2012

(65) Prior Publication Data
US 2014/0150476 A1    Jun. 5, 2014

(30) Foreign Application Priority Data

Jun. 16, 2011    (FR) ...................... 11 01858

(51) Int. Cl.
*F25B 29/00*    (2006.01)
*B60H 1/00*    (2006.01)

(52) U.S. Cl.
CPC ....... *F25B 29/003* (2013.01); *B60H 1/00392* (2013.01); *B60H 1/00785* (2013.01); *B60H 1/00914* (2013.01)

(58) Field of Classification Search
CPC .............. F25B 29/003; B60H 1/00392; B60H 1/00914; B60H 1/00785
See application file for complete search history.

(56) References Cited

U.S. PATENT DOCUMENTS

2011/0016896 A1    1/2011    Oomura et al.

FOREIGN PATENT DOCUMENTS

| FR | 2 958 019 A1 | | 9/2011 |
|---|---|---|---|
| JP | 2003-080931 A | | 3/2003 |
| JP | 2003080931 A | * | 3/2003 |

OTHER PUBLICATIONS

International Search Report for Application No. PCT/EP2012/001776 dated Aug. 17, 2012, 5 pages.
English language abstract and machine-assisted English translation for FR 2 958 019 extracted from espacenet.com database on May 19, 2014, 87 pages.
English language abstract and machine-assisted English translation for JP 2003-080931 extracted from PAJ database on May 19, 2014, 27 pages.

* cited by examiner

*Primary Examiner* — Emmanuel Duke
(74) *Attorney, Agent, or Firm* — Howard & Howard Attorneys PLLC (57) ABSTRACT

The invention relates to a refrigerant circuit for thermally conditioning a vehicle passenger compartment, comprising a plurality of branches containing at least one exchanger, of which branch a first branch is in series with a second branch and a third branch, said second branch being in parallel with said third branch, and a means of placing the third branch m communication with the second branch, said means being installed between a sector of the third branch which sector is situated downstream of an external exchanger and a portion of the second branch which is situated upstream of a first control member.

11 Claims, 3 Drawing Sheets

REFRIGERANT CIRCUIT AND METHOD OF CONTROLLING SUCH A CIRCUIT

RELATED APPLICATIONS

This application is the National Stage of International Patent Application No. PCT/EP2012/001776, filed on Apr. 25, 2012, which claims priority to and all the advantages of French Patent Application No. 11/01858, filed on Jun. 16, 2011, the content of which is incorporated herein by reference.

The technical sector of the present invention is that of assemblies or systems used to condition an air stream entering an automotive vehicle cabin. More particularly, the invention is aimed at a refrigerant fluid circuit used in heating mode, or heat pump mode, in cooling mode or in dehumidification modes. The invention optimizes the parameters of use of the latter operating phase to limit the consumption at iso-performance or to increase the thermal performance of this circuit at iso-consumption.

BACKGROUND

An automotive vehicle is conventionally equipped with an air-conditioning loop or circuit inside which a refrigerant fluid circulates. This loop conventionally comprises a compressor, a condenser, an expansion valve and an evaporator through which the refrigerant fluid passes in this order. The evaporator is installed in a ventilation, heating and/or air-conditioning installation generally mounted in the cabin of the vehicle so as to provide the latter with a hot air stream or a cold air stream as a function of a request from the user of the vehicle. The condenser is for its part conventionally installed in the front face of the vehicle so as to be traversed by the air stream outside the vehicle.

This air-conditioning loop can be used in cooling mode or in heating mode. In cooling mode, the refrigerant fluid is dispatched to the condenser where the refrigerant fluid is cooled by the exterior air stream. Next, the refrigerant fluid circulates toward the expansion valve where it undergoes a lowering of its pressure before entering the evaporator. The refrigerant fluid passing through the evaporator is then heated by the air stream entering the ventilation installation, this being correlatively manifested by a cooling of this air stream with the aim of air-conditioning the cabin of the vehicle. The circuit being a closed loop, the refrigerant fluid then returns toward the compressor.

In heating mode, the fluid is set into circulation by the compressor which dispatches it to the evaporator. The latter then behaves as a condenser, where the refrigerant fluid is cooled by the air circulating in the ventilation installation. This air therefore heats up in contact with the evaporator and thus feeds heat to the cabin of the vehicle. After passing through the evaporator, the refrigerant fluid is expanded by an expansion valve before arriving in the condenser. The exterior air stream then heats the refrigerant fluid. The exterior air stream is consequently colder after it passes along the condenser as compared with its temperature before it passes through the condenser. The refrigerant fluid then returns toward the compressor.

Such a layout has been improved by supplementing the air-conditioning loop presented hereinabove through the addition of a further exchanger traversed by the refrigerant fluid and whose function is to heat the air dispatched into the cabin. Thus, this so-called "interior" exchanger behaves as a radiator.

Figure 4:
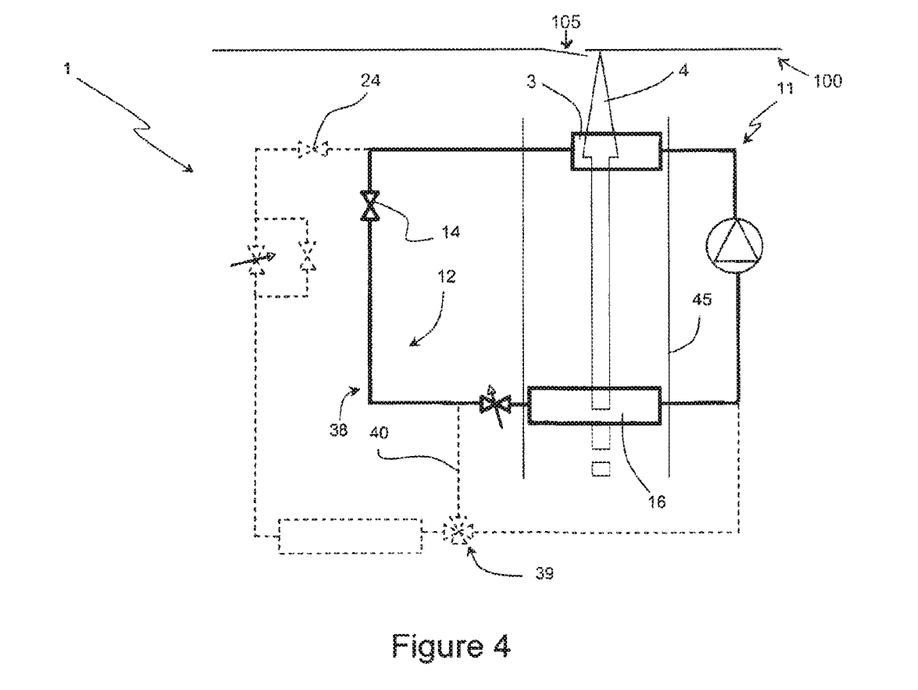
FIG. 4 is a diagram of the circuit according to the invention operating in a second mode of dehumidification of the cabin.

An air-conditioning loop such as mentioned hereinabove is disclosed in the document US2011/0016896A1. FIG. 4 of this document shows a mode of dehumidification where the refrigerant fluid circulates in the interior exchanger and then at one and the same time in the exterior exchanger and in the evaporator, these two components being installed in parallel with respect to one another.

Such a layout presents a first drawback. Indeed, the number of valves disclosed in this document and necessary for the heating, cooling and dehumidification mode of operation ($1^{st}$ mode and $2^{nd}$ mode) is significant. Such a quantity of components is not compatible with the automobile sector where the number of components necessary for carrying out a function needs to be reduced to the strict minimum.

The loop presented in this document presents a second drawback. Indeed, the dehumidification mode shown in FIG. 4 of this document employs one and the same expansion device for the evaporator and for the exterior exchanger. Now, the temperature of the air which passes through each of these exchangers is not the same, in particular because of the position of the air inlet flap which influences the temperature of the air which passes through the evaporator. It is then not possible to independently adapt the flow rate of refrigerant fluid which circulates in the evaporator and in the exterior exchanger when the loop is in the dehumidification mode of FIG. 4 of this document.

SUMMARY OF THE INVENTION

The aim of the present invention is therefore to resolve the drawbacks described hereinabove mainly by allowing the refrigerant fluid to circulate, during the dehumidification mode, at one and the same time in the exterior exchanger and in the evaporator, while offering the possibility of modulating the flow rate of this refrigerant fluid independently with respect to one another. Such modulation is rendered possible by the presence of a first expansion member in a branch which supplies the exterior exchanger and by the presence of a second expansion member, distinct from the first expansion member, installed in a parallel branch which supplies the evaporator.

The subject of the invention is therefore a refrigerant fluid circuit for thermally conditioning a cabin of a vehicle, comprising:
  a first branch in which are installed in series at least one compressor and an interior exchanger designed to ensure thermal exchange between the refrigerant fluid and an air stream, termed the interior air stream, intended to be dispatched into the cabin,
  a second branch in which are installed in series at least one first means for controlling the circulation of the refrigerant fluid in said second branch, a first expansion member and an evaporator,
  a third branch in which are installed in series at least one second expansion member and an exterior exchanger designed to ensure thermal exchange between the refrigerant fluid and an air stream, termed the exterior air stream, arranged outside the cabin,
  said first branch being in series with the second branch and the third branch, said second branch being in parallel with said third branch, and
  a means for placing the third branch in communication with the second branch, said means being installed between a sector of the third branch situated downstream of the exterior exchanger and a portion of the second branch situated upstream of the first control member, according to a direction in which the refrigerant fluid is able to circulate in the branch concerned.

According to a first characteristic of the invention, the means for placing in communication is formed by at least one member for managing the circulation of the refrigerant fluid in the sector or in a conduit installed between the sector and the portion.

According to a second characteristic of the invention, the management member is formed by a first two-way valve installed in the conduit and a second two-way valve installed in the sector.

Alternatively, the management member is formed by a three-way valve installed at a confluence of the conduit with the third branch.

According to another characteristic of the invention, the conduit is hooked up to the second branch between the first control means and the first expansion member.

According to another exemplary embodiment, the management member is formed by a three-way valve installed at a confluence of the conduit with the second branch.

According to a further characteristic of the invention, the management member is installed between the first control means and the first expansion member.

It will be noted that the third branch comprises a second means for controlling the circulation of refrigerant fluid in said third branch.

In an illustrative manner, the second control means is installed upstream of the second expansion member, according to the direction according to which the refrigerant fluid is able to circulate in the third branch.

The third branch comprises a bypass valve for the second expansion member.

Advantageously, the circuit according to the invention is designed to operate according to a mode of heating where a quantity of heat absorbed by the exterior exchanger is dissipated in the interior air stream by the interior exchanger, according to a mode of cooling where a quantity of heat absorbed by the interior exchanger, then employed as an evaporator, is dissipated in the exterior air stream by the exterior exchanger and according to three modes of dehumidification which combine the heating mode and the cooling mode, and in which a refrigerant fluid circulates in the same direction whatever the mode.

The circuit therefore comprises a refrigerant fluid and means which, in the heating mode and in the various modes of dehumidification, are designed to:
  impose a circulation of refrigerant fluid in the first branch and in the third branch, the second branch being devoid of circulation of refrigerant fluid,
  impose a circulation of refrigerant fluid in the first branch, in the third branch, in the means for placing the third branch in communication with the second branch, and in the second branch, the sector of the third branch and the portion of the second branch being devoid of circulation of refrigerant fluid,
  impose a circulation of refrigerant fluid in the first branch and in the second branch, the third branch being devoid of circulation of refrigerant fluid,
  impose a circulation of refrigerant fluid in the first branch and simultaneously in the second and the third branch.

The invention is also aimed at a method of controlling a thermal system for conditioning an interior air stream dispatched into a cabin of a vehicle comprising a circuit such as presented hereinabove and a housing in which said interior air stream circulates and containing the interior exchanger, the evaporator, and in which:

the circuit is activated, advantageously according to a dehumidification mode,
the presence of ice on the exterior exchanger is determined,
in the presence of ice:
  a circulation of refrigerant fluid is imposed in the first branch, in the third branch, in the means for placing the third branch in communication with the second branch, and in the second branch,
in the absence of ice, the temperature of the interior air stream (4) is determined,
if the temperature of the interior air stream (4) is above a threshold temperature, a circulation of refrigerant fluid is imposed in the first branch (11) and in the second branch (12),
if a power delivered by the circuit is less than a low power threshold, a circulation of refrigerant fluid is imposed in the first branch (11) and simultaneously in the second and the third branch (12, 13),
if the temperature of the interior air stream (4) is below the threshold temperature, a circulation of refrigerant fluid is imposed in the first branch (11) and in the third branch (13).

The circuit employed in this method comprises an air inlet device controlling the quantity of air outside the cabin and/or the quantity originating from the cabin admitted into the housing. In this situation, the method implements the following steps, where:
  in the presence of ice, the air inlet device is positioned so that the air admitted into the housing consists of at least 80% of air originating from the cabin,
  if the power delivered by the circuit is above a determined power threshold, the air inlet device is positioned so that the air admitted into the housing consists predominantly of air originating from outside the cabin,
  if the power delivered by the circuit is not sufficient, the air inlet device is positioned so that the air admitted into the housing consists wholly of air originating from the cabin,
  if the temperature is below the threshold temperature, the air inlet device is positioned so that the air admitted into the housing consists wholly of air originating from the cabin.

According to one mode of implementation of this method, the air inlet device is positioned as a function of an item of information regarding quality of the air present in the cabin.

Finally, the method detailed hereinabove comprises a step of comparing the multiplicity of possibility of positions of the air inlet device and a step where the position where the quantity of exterior air is the most significant is imposed.

A foremost advantage according to the invention resides in the possibility of matching the flow rate of refrigerant fluid which circulates simultaneously in the evaporator and in the outside exchanger to the temperature of the air which passes through these exchangers. It is thus guaranteed that each of these components works at a maximum effectiveness level, thereby making it possible to optimize the general efficiency of the circuit when the latter operates in dehumidification modes.

Another notable advantage resides in the general structure of this circuit which comprises few valves whereas it is able to implement a thermodynamic cycle in heating mode, in cooling mode and three distinct dehumidification modes.

BRIEF DESCRIPTION OF THE DRAWINGS

Other characteristics, details and advantages of the invention will emerge more clearly on reading the description given hereinafter by way of indication in conjunction with the drawings in which.

It should be noted that the figures set forth the invention in detail so as to implement the invention, said figures being able of course to serve to better define the invention if appropriate.

DETAILED DESCRIPTION

Figure 1:
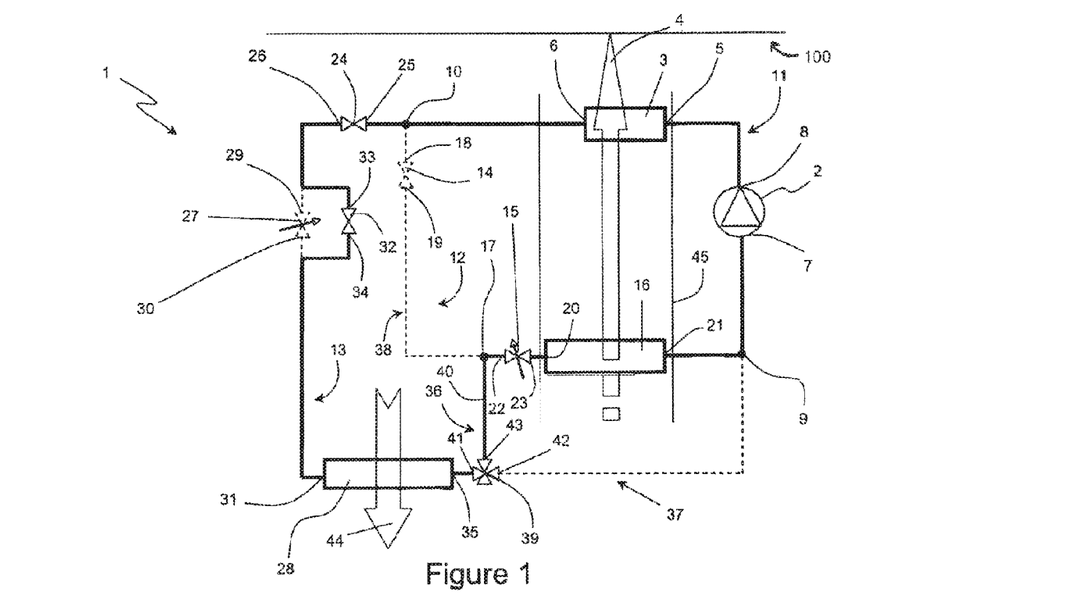
FIG. 1 is a diagram of the circuit according to the invention operating in a mode of cooling of the cabin.

FIG. 1 illustrates the circuit 1 according to the invention. Hereinafter, a description of the architecture of this circuit whatever the mode of operation will be concentrated on initially, and then, subsequently, the route followed, or able to be followed, by a refrigerant fluid circulating in the circuit will be described for each of the modes of operation.

The terms "upstream" and "downstream" employed hereinbelow refer to the direction of travel of the fluid considered in the component considered.

The circuit 1, otherwise called an air-conditioning loop, is a closed loop inside which the refrigerant fluid circulates. The refrigerant fluid is of the type of a super-critical fluid, such as carbon dioxide, for example, known by the name R744. The refrigerant fluid is preferably a sub-critical fluid, such as hydrofluorocarbon, known by the acronym R134a, or a low-nuisance refrigerant fluid having little impact on the greenhouse effect, that is to say which is able to offer a lasting solution in respect of automobile air-conditioners, known by the term HFO1234yf. For the two types of fluid mentioned hereinabove, the circuit can comprise an internal exchanger (not represented) charged with improving the performance of the circuit by thermal exchange between the refrigerant fluid subjected to high temperature—high pressure and this same refrigerant fluid subjected to low temperature—low pressure.

The refrigerant fluid is set into circulation by a compressor 2, for example driven by an electric motor, in particular integrated into a housing of the compressor. The function of the latter is to increase the pressure and the temperature of the refrigerant fluid. It will be noted that the compressor 2 can also be driven by a pulley set into motion by an internal combustion engine mounted on the vehicle, in particular via a belt.

The compressor 2 comprises an admission orifice 7 through which the refrigerant fluid, at low pressure and low temperature, enters the compressor. This fluid exits the compressor 2 through a discharge orifice 8 in a state of high pressure and high temperature, compared with the state of this same fluid at the admission orifice 7.

Found upstream of the compressor 2, and linked in a direct manner to the admission orifice 7 by a device for transporting the refrigerant fluid, is a point of convergence 9. The latter forms the location a refrigerant fluid originating from two distinct branches is combined to form just a single stream. It will be noted that this point of convergence 9 forms a departure point, stated otherwise one of the ends, of a first branch 11 of the circuit 1.

Directly downstream of the compressor 2 is found a heat exchanger dubbed "interior" in the sense that it is intended to modify the temperature of an interior air stream 4 dispatched into the cabin, referenced 100. This interior exchanger, referenced 3, is thus designed to carry out thermal exchange between the interior air stream 4 and the refrigerant fluid circulating in the circuit 1. Thus, when the refrigerant fluid circuit 1 operates in heating mode, the refrigerant fluid transmits its heat to the interior air stream 4. An interior exchanger such as this comprises a first orifice 5 through which the refrigerant fluid originating from the compressor 2 enters the interior exchanger. The interior exchanger 3 also comprises a second orifice 6 through which the refrigerant fluid exits after having exchanged thermally with the interior air stream 4.

This interior exchanger 3 is installed in a housing 45 charged with channeling the interior air stream 4 before entering the cabin 100 of an automotive vehicle.

A device for transporting the refrigerant fluid therefore directly links the discharge orifice 8 of the compressor 2 and the first orifice 5 of the interior exchanger 3 without the presence of any other so-called "active" component, that is to say one which influences the thermodynamic cycle.

A device for transporting the heat-carrying fluid such as a duct or tube places the second orifice 6 of the interior exchanger 3 in communication directly with a point of divergence 10. Such a point forms a "Y" where the refrigerant fluid may be separated into two distinct streams dispatched toward a second branch, referenced 12, of the circuit and a third branch, referenced 13, of the circuit. The point of divergence 10 forms the second end of the first branch 11.

It is understood from the foregoing that the first branch 11 is formed by a part of the circuit 1 which extends from the point of convergence 9 to the point of divergence 10. The first branch 11 thus comprises, advantageously solely, the compressor 2, the interior exchanger 3 and means for transporting the refrigerant fluid, all installed in series in relation to one another.

The first branch 11, the second branch 12 and the third branch 13 are hooked up with one another at the level of the point of convergence 9 and at the level of the point of divergence 10. The second branch 12 and the third branch 13 thus start with the point of divergence 10 and terminate with the point of convergence 9. It is understood from such a structure that the second branch and the third branch are in parallel with respect to one another but they are both in series with the first branch 11.

The second branch 12 comprises components installed in series and active on the thermodynamic cycle which takes place in the circuit 1. Among these components is found a first means 14 for controlling the circulation of the refrigerant fluid in the second branch 12. Such a first means is a full-on/full-off valve but it can also be a proportional valve where the valve can take all positions lying between 0 and 100% of opening.

The first control means 14 thus comprises an inlet 18 through which the refrigerant fluid arrives and an outlet 19 through which the refrigerant fluid exits the first control means. The inlet 18 of the first control means is hooked up, for example directly, to the point of divergence 10.

The second branch 12 further comprises a first expansion member 15 charged with lowering the pressure of the refrigerant fluid, and thus ensuring an expansion necessary for the operation of the thermodynamic cycle which takes place in the refrigerant fluid circuit 1. This expansion member 15 is installed downstream of the first control means 14 and directly upstream of an evaporator 16. In practice, such an expansion member takes the form of a fixed orifice or of a thermostatic expansion valve. Alternatively, such a first member 15 can take the form of an electronically operated expansion valve.

Between the first control means 14 and the first expansion member 15, the second branch 12 comprises a mixing point 17 which will be detailed below.

The outlet 19 of the first control means 14 is connected directly to the mixing point 17 by a refrigerant fluid transporting device.

The first expansion member 15 comprises an inlet 22 connected directly to the mixing point 17 and an outlet 23 hooked up directly to the evaporator 16.

The second branch 12 also comprises the evaporator 16 installed in the housing 45 so as to be traversed by the interior air stream 4. This evaporator 16 is placed upstream of the interior exchanger 3 according to the directions of travel of the interior air stream 4 in the housing 45. This component is a thermal exchanger intended to cool the interior air stream 4 which passes therethrough when the circuit is, for example, in cooling mode. This evaporator also ensures drying of the interior air stream 4 by condensation on its external walls, such a function being particularly implemented during the dehumidification modes.

This evaporator comprises an inlet orifice 20 hooked up directly to the outlet 23 of the first expansion member 15, as well as an outlet orifice 21 hooked up directly to the point of convergence 9.

It is understood from the foregoing that the second branch 12 is formed by a part of the circuit 1 which extends from the point of divergence 10 to the point of convergence 9. The second branch 12 thus comprises, advantageously solely, the first means 14 for controlling the circulation of the refrigerant fluid in the second branch, the mixing point 17, the first expansion member 15, the evaporator 16 and means for transporting the refrigerant fluid so as to link these components, all installed in series with respect to one another.

The third branch 13 starts at the point of divergence 10 and comprises components installed in series and active on the thermodynamic cycle which takes place in the circuit 1. Among these components is found a second means 24 for controlling the circulation of the refrigerant fluid in the third branch 13. Such a second means is a full-on/full-off valve but it can also be a proportional valve where the valve can take all positions lying between 0 and 100% of opening.

This second control means 24 comprises an inlet 25 connected directly to the point of divergence 10 and an outlet 26, the latter being hooked up to a second expansion member 27. The latter is charged with lowering the pressure of the refrigerant fluid, and thus ensuring an expansion necessary for the operation of the thermodynamic cycle which takes place in the refrigerant fluid circuit 1. This second expansion member 27 is installed directly downstream of the second control means 24 and directly upstream of an exterior exchanger 28. In practice, such an expansion member takes the form of a fixed orifice or of a thermostatic expansion valve. Alternatively, such a first member 15 can take the form of an electronically operated expansion valve.

It is thus understood that the second control means 24 is installed upstream, advantageously directly, of the second expansion member 27.

The second expansion member 27 exhibits an inlet 29 hooked up directly to the outlet 26 of the second control means 24 and an outlet 30 hooked up directly to an inlet orifice 31 of the exterior exchanger 28.

As a function of the mode of operation selected, the refrigerant fluid can bypass the second expansion member 27. Accordingly, the third branch 13 comprises a bypass valve 32 for the second expansion member 27.

This bypass valve 32 is then installed in parallel exclusively with the second expansion member 27. Thus, a conduit links the inlet 29 of the second expansion member 27 with an inlet 33 of the bypass valve 32. In a similar manner, another conduit is envisaged, linking the outlet 30 of the second expansion member 27 to an outlet 34 of the bypass valve 32.

Thus, the inlet 29 of the second expansion member 27 and the inlet 33 of the bypass valve 32 are both linked directly to the outlet 26 of the second means 24 for controlling the circulation of the refrigerant fluid. The second expansion member 27 and the bypass valve 32 are both directly downstream of the second control means 24.

The outlet 30 of the second expansion member 27 and the outlet 34 of the bypass valve 32 are both linked directly to the inlet orifice 31 of the exterior exchanger 28.

The circuit 1 moreover comprises the heat exchanger referenced 28 dubbed "exterior", in the sense that it is designed to carry out thermal exchange between an exterior air stream 44 outside the cabin of the vehicle and the refrigerant fluid which circulates in the circuit 1.

Such an exterior exchanger can be used in the guise of gas cooler or condenser when the refrigerant fluid circuit is operated in cooling mode in respect of the air stream dispatched into the cabin.

This same exchanger can also be used in the guise of evaporator when the refrigerant fluid circuit is operated in heating mode in respect of the air stream dispatched into the cabin.

This exterior exchanger 28 comprises an outlet orifice 35 connected directly to a means 36 for placing the third branch 13 in communication with the second branch 12.

From the outlet orifice 35, the third branch 13 is continued by a sector 37 which extends up to the point of convergence 9, according to this arrangement, the sector 37 is downstream of the exterior exchanger 28.

The circuit 1 according to the invention also comprises the means 36 for placing the third branch 13 in communication with the second branch 12. These two branches are placed in communication between the sector 37 of the third branch 13 and a portion 38 of the second branch 12 which extends from the point of divergence 10 up to the inlet 22 of the first expansion member 15. In a more precise manner, the portion 38 starts at the outlet 19 of the first control means 14.

Stated otherwise, the mixing point 17 is placed downstream of the first control means 14 and upstream of the first expansion member 15, i.e. between the outlet 19 of the first control means 14 and the inlet 22 of the first expansion member 15.

According to one embodiment, the means 36 for placing in communication takes the form of at least one means or member 39 for managing the circulation of the refrigerant fluid in the sector 37 combined with a conduit 40 installed between the sector 37 and the portion 38, the conduit 40 being hooked up to the mixing point 17. The conduit is here formed by a tube and more generally by any means which is inactive on the thermodynamic cycle and able to transport the refrigerant fluid from a first point to a second point of the circuit.

According to an exemplary embodiment not represented, the management member is formed by a first two-way valve installed in the conduit and a second two-way valve installed in the sector.

Alternatively and as represented in FIGS. 1 to 5, the management member 39 is formed by a three-way valve installed at a confluence of the conduit 40 with the sector 37, formed at the level of the third branch 13.

Whether it is a three-way valve or a plurality of two-way valves, the latter manage the circulation of the refrigerant fluid in the sector 37 destined for the point of convergence 9 and/or destined for the portion 38 formed at the level of the second branch 12.

These valves can also operate according to a full-on/full-off mode, or according to a proportional mode in which the valve can take all positions lying between 0 and 100% of opening.

Alternatively to the positioning of the management member 39 envisaged hereinabove, the invention provides for the case where the management member is formed by a three-way valve installed at a confluence of the conduit with the second branch, otherwise at the level of the mixing point.

According to the example of FIG. 1, the management member 39 exhibits an inlet 41 directly hooked up to the outlet orifice 35 of the exterior exchanger 28. It is therefore understood that this management member 39 is downstream of the exterior exchanger 28.

The management member 39 further comprises a first outlet 42 hooked up to the point of convergence 9 by an element for transporting fluid which is inactive on the thermodynamic cycle. Finally, the management member 39 exhibits a second outlet 43 hooked up to the mixing point 17 directly by the conduit 40.

FIG. 1 shows the circuit 1 according to the invention in a mode of cooling of the air dispatched into the cabin of the vehicle.

The refrigerant fluid is compressed by the compressor 2 and exits the latter through the discharge orifice 8 in the gaseous state, subjected to high pressure and high temperature. This refrigerant fluid passes through the interior exchanger 3 without undergoing thermal exchange with the interior air stream 4. Accordingly, a flap (not represented) prohibits the passage of the air stream through the interior exchanger. According to a variant embodiment not represented, the circuit 1 can comprise a tube for bypassing the interior exchanger enabling the refrigerant fluid to avoid entering this exchanger. Anyway, the interior exchanger is inactive in relation to the interior air stream 4.

The refrigerant fluid continues its path and arrives at the point of divergence 10. As the first control means 14 is closed, the refrigerant fluid does not circulate in the second branch 12. Correlatively, the second control means 24 is open, permitting circulation of refrigerant fluid toward the exterior exchanger 28. Before reaching the latter, the refrigerant fluid passes through the bypass valve 32 without undergoing any lowering of the pressure.

The refrigerant fluid is then cooled by the exterior air stream 44.

The management member 39 is placed in a position where the refrigerant fluid circulates from the inlet 41 to the second outlet 43 and circulates through the conduit 40 toward the mixing point 17. The refrigerant fluid is thereafter expanded by the first expansion member 15 and then passes through the evaporator 16, where it picks up the heat present in the interior air stream 4, thus air-conditioning the cabin 100 of the vehicle. The refrigerant fluid thus subjected to low pressure and low temperature thereafter reaches the point of convergence 9, and then rejoins the admission orifice 7 of the compressor 2, before performing a new thermodynamic cycle.

In this mode of cooling, it will be noted that the conduit situated between the first outlet 42 of the management member 39 and the point of convergence 9 is not traversed by the refrigerant fluid. Likewise, the second branch 12 situated between the point of divergence 10 and the mixing point 10 does not see any circulation of refrigerant fluid.

Figure 2:
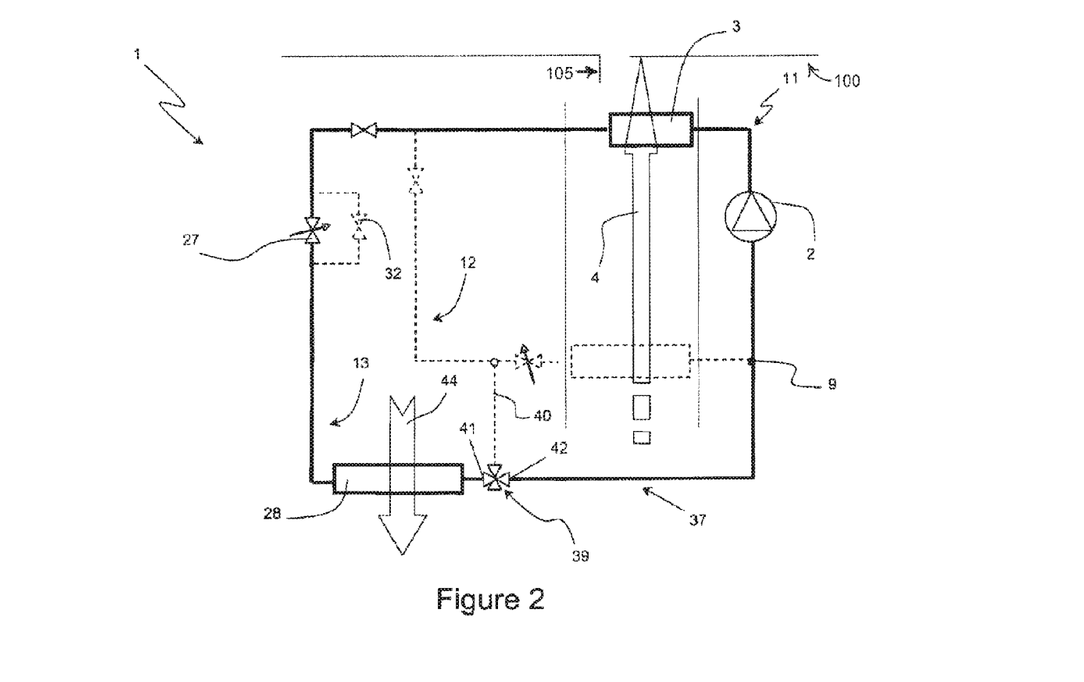
FIG. 2 is a diagram of the circuit according to the invention operating in a mode of heating of the cabin.

FIG. 2 shows the circuit 1 when the latter is used in heating mode in respect of the cabin. It will be noted that the refrigerant fluid circulates in the same direction in the core of the circuit 1 as the direction of circulation for the cooling mode presented hereinabove. The description hereinbelow concentrates on the differences and the description of FIG. 1 will be referred to for the identical elements.

The first branch 11 is traversed by the refrigerant fluid set into motion by the compressor 2. The interior exchanger 3 dissipates the heat present in the refrigerant fluid, subjected to high pressure and high temperature, in the interior air stream 4 which passes through the interior exchanger. The heating of the air dispatched into the cabin is thus ensured.

The bypass valve 32 is here in the closed position and the refrigerant fluid then passes through the second expansion member 27 where it undergoes a lowering of its pressure. The refrigerant fluid then reaches the exterior exchanger 28 and passes through the latter while undergoing heating to the benefit of the exterior air stream 44.

The management member 39 permits the circulation of the refrigerant fluid from its inlet 41 to its first outlet 42. The refrigerant fluid then rejoins the point of convergence 9 by passing through the sector 37 before rejoining the compressor.

The second branch 12 and the conduit 40 are thus not traversed by the refrigerant fluid since the latter circulates exclusively in the first branch 11 and in the third branch 13.

Figure 3:
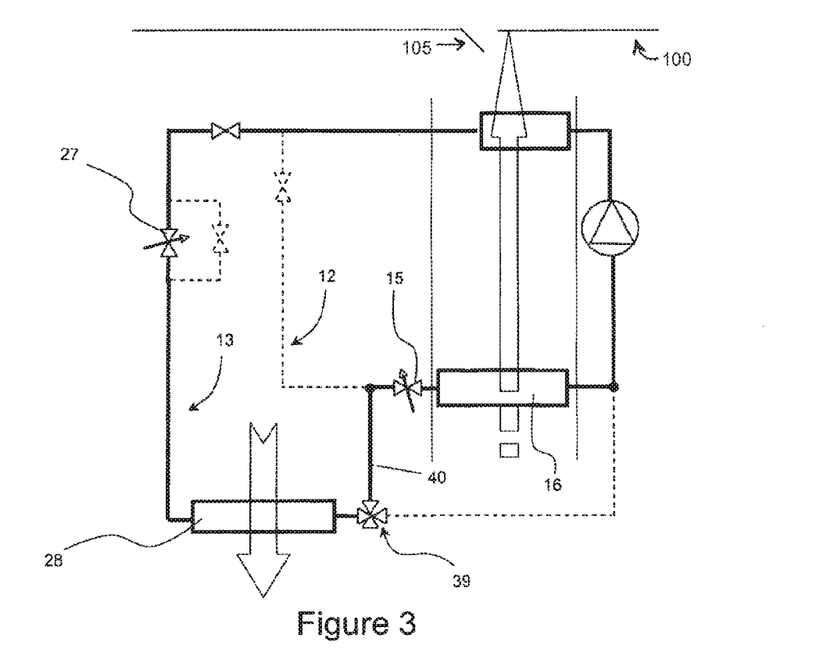
FIG. 3 is a diagram of the circuit according to the invention operating in a first mode of dehumidification of the cabin.

FIG. 3 shows the circuit 1 when the latter is employed according to a first mode of dehumidification. In a general manner, the dehumidification modes are a combination of the heating mode and of the cooling mode alluded to in the figures hereinabove.

It will be noted that the refrigerant fluid circulates in the same direction in the core of the circuit 1 as the direction of circulation for the modes described previously.

The description hereinbelow concentrates on the differences with respect to FIG. 1.

The heating power to be provided by the circuit 1 to effect a first mode of dehumidification is low. This is manifested by a temperature outside the cabin of between +5 and −20° C., and a state of icing of the exterior exchanger 28.

In this first mode of dehumidification, the exterior exchanger 28 is placed in series with the evaporator 16. Such a placement in series results from the placing of the third branch 13 in communication with the second branch 12 by virtue of the management member 39 and of the conduit 40.

Each of these exchangers is preceded by its own expansion member. Indeed, the refrigerant fluid passes through the second expansion member 27 where it undergoes a lowering of its pressure before passing through the exterior exchanger 28. In a similar manner, the first expansion member 15 lowers the pressure of the refrigerant fluid before the latter enters the evaporator 16. Even if the first expansion member 15 is influenced by the level of expansion of the second expansion member 27, it is nonetheless possible to adapt the flow rate of refrigerant fluid inside these exchangers in a separate manner.

FIG. 4 shows a second mode of dehumidification implemented by the circuit 1 according to the invention. The second dehumidification mode allows the circuit 1 to deliver a greater heating power than that of the first dehumidification mode detailed previously.

The heating power to be provided by the circuit 1 to effect the second mode of dehumidification is medium. This is manifested by a temperature measured inside the cabin of greater than 20° C. and a heating power of the circuit which is less than the power requested according to a temperature setpoint.

Here, the heating of the interior air stream 4 and the dehumidification of the latter are ensured solely by the interior exchanger 3, the evaporator 16 and the position of an air inlet device, referenced 105, which manages the origin of the air stream dispatched into the housing 45.

In this second mode of dehumidification, the refrigerant fluid circulates only in the first branch 11 and in the second branch 12. Accordingly, the first control means 14 is open whereas the second control means 24 is placed in the closed position. Likewise, the management member 39 prohibits any circulation in the duct 40 so that all of the refrigerant fluid which passes through the interior exchanger 3 also passes through the evaporator 16.

Figure 5:
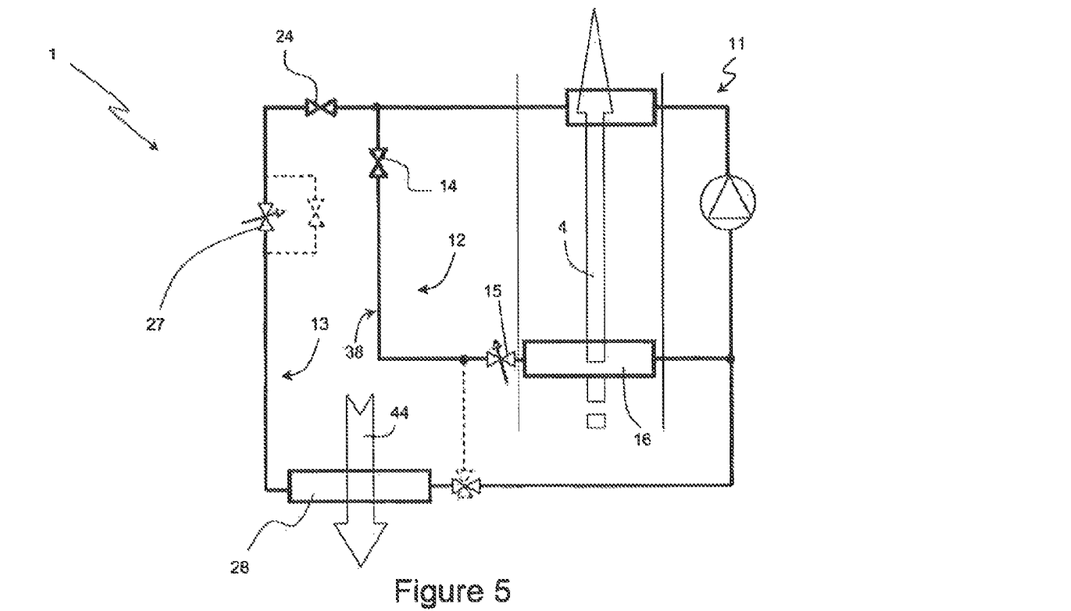
FIG. 5 is a diagram of the circuit according to the invention operating in a third mode of dehumidification of the cabin.

FIG. 5 shows a third mode of dehumidification implemented by the circuit 1. According to this mode, the heating power to be provided by the circuit 1 to effect this mode of dehumidification is significant. This is manifested by a temperature measured inside the cabin which is greater than 20° C. and by a heating power provided by the internal exchanger 3 alone which is insufficient. To alleviate such an insufficiency of heating, the circuit 1 draws off the heat present in the exterior air via the external exchanger 28.

The thermal energy is then drawn off in parallel with the exterior exchanger 28 and with the evaporator 16.

In such a situation, the refrigerant fluid circulates in the first branch 11 and simultaneously in the second branch 12 and in the third branch 13. Accordingly, the first control means 14 and the second control means 24 are open and allow the refrigerant fluid to pass.

The first expansion member 15 lowers the pressure of the refrigerant fluid in a manner totally independent of the pressure drop effected by the second expansion member 27. It is thus possible to adapt the flow rate of refrigerant fluid in the exterior exchanger 28 and in the evaporator 16 respectively as a function of the temperature of the exterior air stream 44 and as a function of the temperature of the interior air stream 4.

It is thus understood that the circuit set forth hereinabove comprises means for making the refrigerant fluid circulate either:
- only in the second branch 12,
- only in the third branch 13,
- in the third branch 13 and then in the second branch 12 by a circulation in series of the exterior exchanger 28 with respect to the evaporator 16 via the means 36 for placing in communication,
- simultaneously, that is to say in parallel, in the second branch 12 and in the third branch 13, the circulations indicated hereinabove being necessarily combined with a circulation of the refrigerant fluid in the first branch 11.

Figure 6:
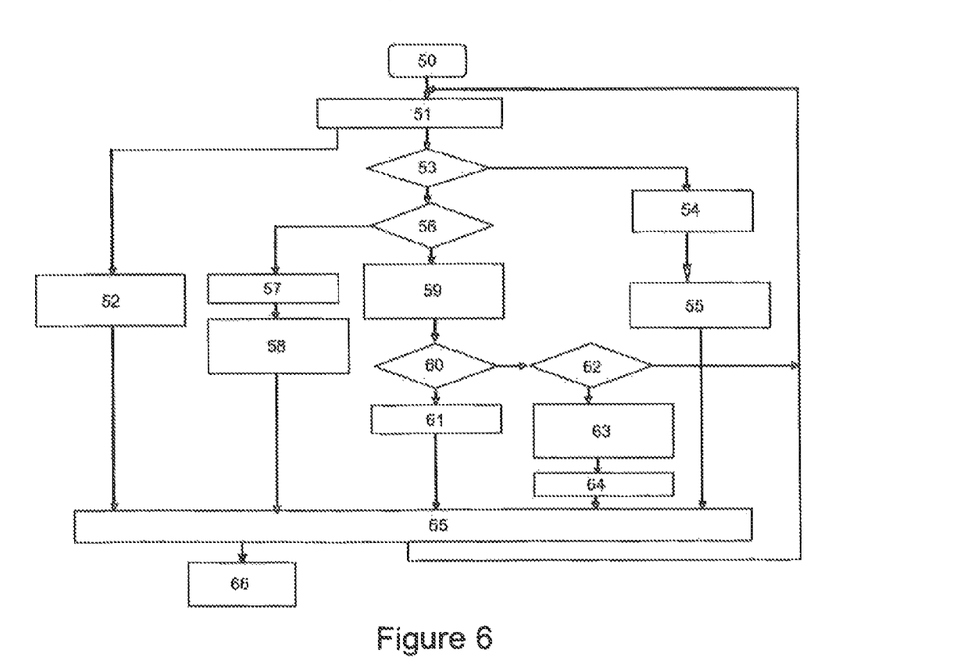
FIG. 6 is a logic diagram illustrating the method according to the invention.

FIG. 6 illustrates a method of control, or of command, of a thermal system for conditioning an interior air stream dispatched into a cabin of a vehicle comprising a circuit 1 such as detailed hereinabove. The thermal conditioning system furthermore comprises the housing 45 in which the interior air stream 4 circulates. This housing 45 encloses the evaporator 16 and the interior exchanger 3 so that the interior air stream passes through them in this order.

The method according to the invention provides for a step 50 in the course of which the circuit 1 is set into operation. In an optional manner, the method continues with a step 51 which is a step of acquiring data, in particular the temperature of the interior air stream, the temperature of the exterior air stream, pressures of refrigerant fluid, etc.

The method makes a decisional choice between three dehumidification modes and a heating mode. There is also provision for a fifth choice relating to the quality of the air present in the cabin, such a choice having priority in regard to the other modes of operation. The analysis of the quality of the air inside the cabin is illustrated in step 52 where at least one sensor determines a quantity of pollutant present in the interior air stream 4, in particular carbon dioxide. If the measurement exceeds a determined threshold, step 52 provides for a positioning of the air inlet device 105 controlling the quantity of air outside the cabin and/or the quantity originating from the cabin admitted into the housing according to a position where only the exterior air is admitting into the housing 45. Such a device is for example one or more air inlet flaps and this exemplary embodiment will be referred to in the subsequent description.

In step 53, the method performs a determination of the presence of ice on the exterior exchanger 28. Such a situation can occur in particular when the circuit operates in heating mode and the exterior temperature lies between −20 and +5° C.

If the presence of ice on the exterior exchanger 28 is verified, then in step 54 a circulation of refrigerant fluid is imposed in the first branch 11, in the third branch 13, in the means 36 for placing the third branch 13 in communication with the second branch 12, and in the second branch 12. On the other hand, the method controls the circuit 1 so that the sector 37 and the portion 38 are not traversed by the refrigerant fluid.

Such a configuration corresponds to the circulation illustrated in FIG. 3 and reference may be made to the description of this figure to ascertain the details thereof. This step 54 is accompanied by step 55 where, in the presence of ice, the air inlet device 105 is positioned so that the air admitted into the housing consists of at least 80% of air originating from the cabin.

The measures presented hereinabove make it possible to dehumidify the air stream dispatched into the cabin while limiting the thermal load on the exterior exchanger. The thermal load deficit is then recovered on the evaporator by virtue of the fact that the air that it receives is hot. Indeed, the interior exchanger has previously heated the air present in the cabin and it is advantageous to tap off part of this hot air so that the thermal exchange carried out at the level of the evaporator is performed between fluids exhibiting a significant temperature discrepancy.

If the method does not detect any ice, it passes to step 56. This step performs a decisional choice in relation to the temperature of the air in the cabin, otherwise called the interior air stream 4. The temperature measured in the course of step 51 is then compared with a threshold value.

If the temperature of the interior air stream is below the threshold temperature, a step 57 imposes a circulation of refrigerant fluid only in the first branch and in the third branch, the second branch 12 being devoid of circulation of refrigerant fluid. The second expansion member lowers the pressure of the refrigerant fluid upstream of the exterior exchanger. Such a circulation corresponds to the mode of heating illustrated in FIG. 2 and reference may be made to the description of this figure to ascertain the structure thereof.

A step 58 immediately follows step 57. Step 58 positions the air inlet device 105 so that the air admitted into the housing consists wholly of air originating from the cabin.

Such a layout makes it possible for a previously heated air stream to be made to enter the interior exchanger, the interior air stream circulating here in a closed loop in the cabin via the interior exchanger. The rise in the temperature in the cabin is thus faster.

If in step 56, it is determined that the temperature of the interior air stream is greater than the threshold value, the method provides for a step 59 in the course of which a circulation of refrigerant fluid is imposed only in the first branch and in the second branch, the third branch being devoid of circulation of refrigerant fluid. Such a circulation is presented in FIG. 4 as the second mode of dehumidification and reference may be made to the description of this figure to ascertain the structure thereof.

After step 59, the method implements a decisional step 60 in the course of which is determined the power delivered by the refrigerant fluid circuit.

If the power delivered exceeds a determined high threshold, it is considered that the available power is greater than the thermal requirement of the cabin. Step 61 then positions the air inlet device 105 in a position which will decrease the temperature of the air upstream of the evaporator 16. Accordingly, step 61 positions the air inlet flap or flaps 105 so that the air admitted into the housing consists predominantly of air originating from outside the cabin.

On the other hand, if step 60 determines that the available power is less than the thermal requirement, a step 62 compares the power available on the circuit with the thermal requirement and determines whether this power is below a different determined low threshold, in particular lower, than the high threshold mentioned hereinabove.

If the result of this comparison shows that the available power is greater than this low threshold, the method returns to step 51.

On the other hand, if the result of this comparison shows that the available power is less than this low threshold, the method activates a step 63 which imposes a circulation of refrigerant fluid in the first branch and simultaneously in the second and the third branch, by virtue of the means for placing the third branch in communication with the second branch. Such a circulation corresponds to the third mode of dehumidification presented in FIG. 5 and reference may be made to the description of this figure to ascertain the structure thereof.

After this step 63, the method provides for a step 64 where the air inlet device is positioned so that the air admitted into the housing consists wholly of air originating from the cabin. Thus, the air stream dispatched to the evaporator is hot since it originates from the cabin, thereby making it possible to operate the evaporator more effectively since the temperature discrepancy between the air stream and the refrigerant fluid is significant.

This third mode of dehumidification makes it possible to operate the exterior exchanger with a refrigerant fluid flow rate suited to the temperature of the exterior air stream which passes through it, such an adaptation being implemented by the second expansion member. In parallel therewith, the invention makes it possible to operate the evaporator with a refrigerant fluid flow rate suited to the temperature of the air stream which passes through the evaporator, this temperature being influenced by the position of the air inlet device arranged at the inlet of the housing.

The method according to the invention provides for a step 65 of comparing the multiplicity of hereinabove determined positions of the air inlet device and a step 66 where the position in which the quantity of exterior air is the most significant is imposed.

A choice is thus guaranteed whereby the renewal in terms of exterior air is a maximum as compared with the other positions, received in step 65, of the flap or flaps.

In FIGS. 1 to 5, the heavy lines represent the parts of the circuit in which the refrigerant fluid circulates, in comparison to the dashed lines which represent the parts of the air-conditioning circuit in which the refrigerant fluid does not circulate.

The description hereinabove employs the term "directly" to describe the position of one component with respect to another. This term must be understood in the sense that a first component considered is adjacent to a second component considered, or optionally linked to one another exclusively by a means of refrigerant fluid transport which takes, for example, the form of a duct or of a tube, in particular flexible or rigid. Stated otherwise, the first component considered is linked to the second component considered by a means which is inactive in regard to the thermodynamic cycle which takes place in the circuit.

The invention claimed is:

1. A refrigerant fluid circuit for thermally conditioning a cabin of a vehicle, comprising:
    a first branch in which are installed in series only one compressor, an interior exchanger designed to ensure thermal exchange between the refrigerant fluid and an interior air stream, and means for transporting the refrigerant fluid, to be dispatched into the cabin,
    a second branch in which are installed in series at least one first means of control of the circulation of the refrigerant fluid in said second branch, a first expansion member and an evaporator,
    a third branch in which are installed in series at least one second expansion member and an exterior exchanger designed to ensure thermal exchange between the refrigerant fluid and an exterior air stream, arranged outside the cabin,
    said first branch being in series with the second branch and the third branch, said second branch being in parallel with said third branch, wherein said first branch, said second branch and said third branch are hooked up with one another at a level of a point of convergence and at a level of a point of divergence, wherein said second branch and said third branch start with the point of divergence and terminate with the point of convergence,
    a means for placing the third branch in communication with the second branch, said means being installed between a sector of the third branch situated downstream of the exterior exchanger and a portion of the second branch situated upstream of the first expansion member,
    wherein the circuit is designed to operate according to a mode of heating, according to a mode of cooling, and according to at least three modes of dehumidification which combine the mode of heating and the mode of cooling, and in which a refrigerant fluid circulates in the same direction independent of the mode and
    wherein the circuit comprises means which are designed to:
    impose a circulation of refrigerant fluid in the first branch and in the third branch according to a heating mode, impose a circulation of refrigerant fluid in the first branch, in the third branch, in the means for placing the third branch in communication with the second branch, and in the second branch, according to a first mode of dehumidification, impose a circulation of refrigerant fluid in the first branch and in the second branch according to a second mode of dehumidification, impose a circulation of refrigerant fluid in the first branch and simultaneously in the second and the third branch according to a third mode of dehumidification.

2. The circuit as claimed in claim 1, in which the means for placing in communication is formed by at least one member for managing the circulation of the refrigerant fluid in the sector or in a conduit installed between the sector and the portion of the second branch.

3. The circuit as claimed in claim 2, in which the conduit is hooked up to the second branch between the first means of control and the first expansion member.

4. The circuit as claimed in claim 3, in which the third branch comprises a second means for controlling the circulation of refrigerant fluid in said third branch.

5. The circuit as claimed in claim 2, in which the third branch comprises a second means for controlling the circulation of refrigerant fluid in said third branch.

6. The circuit as claimed in claim 1, in which the third branch comprises a second means for controlling a circulation of refrigerant fluid in said third branch.

7. The circuit as claimed in claim 6, in which the second control means is installed upstream of the second expansion member.

8. The circuit as claimed in claim 1, in which the third branch comprises a bypass valve of the second expansion member.

9. A method of controlling a thermal system for conditioning an interior air stream dispatched into a cabin of a vehicle comprising:

a circuit, which comprises a first branch in which are installed in series only one compressor, an interior exchanger designed to ensure thermal exchange between the refrigerant fluid and the interior air stream, and means for transporting the refrigerant fluid, to be dispatched into the cabin, a second branch in which are installed in series at least one first means of control of the circulation of the refrigerant fluid in said second branch, a first expansion member and an evaporator, a third branch in which are installed in series at least one second expansion member and an exterior exchanger designed to ensure thermal exchange between the refrigerant fluid and an exterior air stream, arranged outside the cabin, said first branch being in series with the second branch and the third branch, said second branch being in parallel with said third branch, wherein said first branch, said second branch and said third branch are hooked up with one another at a level of a point of convergence and at a level of a point of divergence, wherein said second branch and said third branch start with the point of divergence and terminate with the point of convergence, a means for placing the third branch in communication with the second branch, said means being installed between a sector of the third branch situated downstream of the exterior exchanger and a portion of the second branch situated upstream of the first expansion member;

and a housing in which said interior air stream circulates, and containing the interior exchanger, the evaporator, in which:

a) the circuit is activated, b) the presence of ice on the exterior exchanger is determined, c) in the presence of ice, a circulation of refrigerant fluid is imposed in the first branch, in the third branch, in the means for placing the third branch in communication with the second branch, and in the second branch, according to a first mode of dehumidification, d) in the absence of ice, the temperature of the interior air stream is determined, and a circulation of refrigerant fluid is imposed in d2) in the first branch and simultaneously in the second and the third branch according to a third mode of dehumidification and any one of:

d1) in the first branch and in the second branch according to a second mode of dehumidification, and d3) in the first branch and in the third branch according to a heating mode.

10. The method as claimed in claim 9, where the housing comprises an air inlet device controlling the quantity of air outside the cabin and/or the quantity originating from the cabin admitted into the housing, in which:

in the presence of ice, the air inlet device is positioned so that the air admitted into the housing consists of at least 80% of air originating from the cabin in the first mode of dehumidification;

and in the absence of ice, the air inlet device is positioned so that the air admitted into the housing consists predominantly of air originating from outside the cabin in the second mode of dehumidification; or the air inlet device is positioned so that the air admitted into the housing consists wholly of air originating from the cabin in either the heating mode or the third mode of dehumidification.

11. The method as claimed in claim 10, in which the air inlet device is positioned based on a quantity of pollutant present in the interior air stream.

* * * * *

UNITED STATES PATENT AND TRADEMARK OFFICE
CERTIFICATE OF CORRECTION

PATENT NO. : 9,732,993 B2
APPLICATION NO. : 14/126231
DATED : August 15, 2017
INVENTOR(S) : Jin-Ming Liu It is certified that error appears in the above-identified patent and that said Letters Patent is hereby corrected as shown below:

On the Title Page

Item [73], delete "SYSTEMS" and replace with -- SYSTEMES --

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*